(No Model.)
T. ROWAN.
WARMING AND VENTILATING AND APPARATUS THEREFOR.
No. 283,149. Patented Aug. 14, 1883.
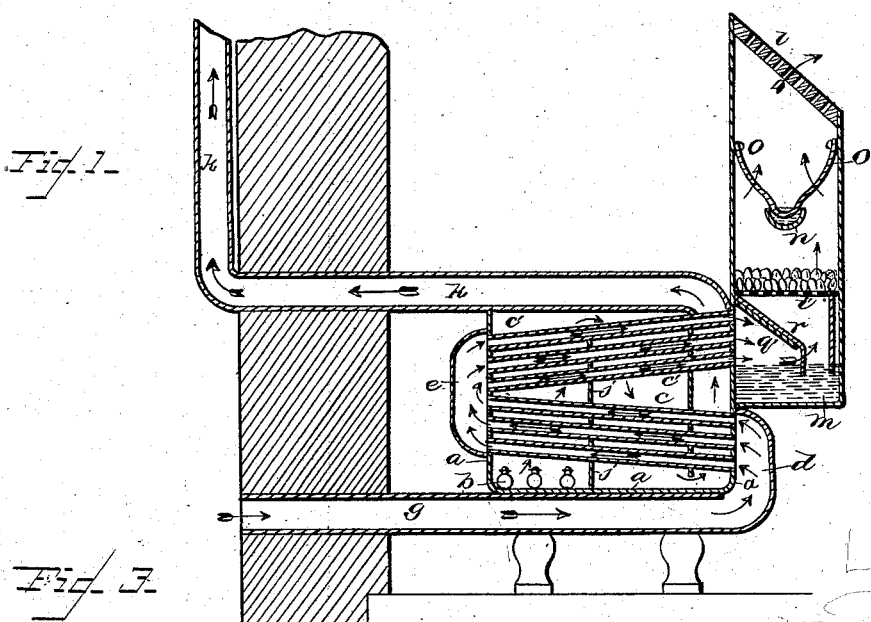
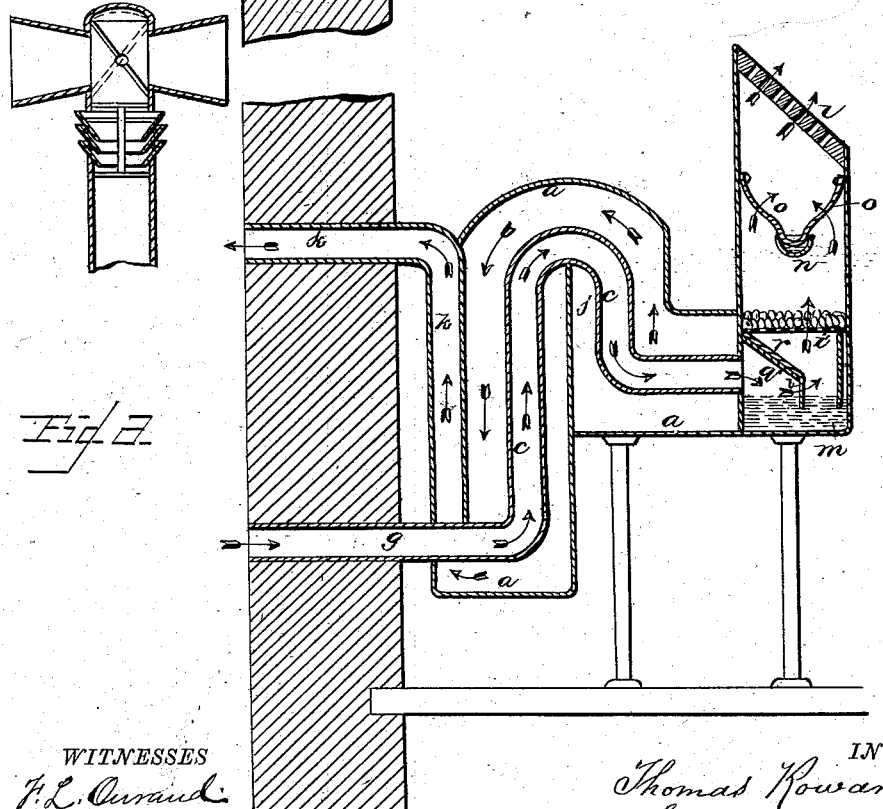
WITNESSES
F. L. Durand
Chas. R. Abell
INVENTOR
Thomas Rowan,
by John J. Halsted & Son
his Attorneys.

United States Patent Office.

THOMAS ROWAN, OF LONDON, ENGLAND.

WARMING AND VENTILATING AND APPARATUS THEREFOR.

SPECIFICATION forming part of Letters Patent No. 283,149, dated August 14, 1883.

Application filed November 3, 1882. (No model.) Patented in England December 7, 1881, No. 5,351, and in Canada December 1, 1882, No. 15,876.

*To all whom it may concern:*

Be it known that I, THOMAS ROWAN, a subject of the Queen of Great Britain, residing at London, England, have invented certain new and useful Improvements in Warming and Ventilating and Apparatus Therefor, the improvements being partly applicable to other purposes, (for which I have obtained a patent in England, No. 5,351, bearing date the 7th day of December, 1881, and sealed June 2, 1882,) of which the following is a specification.

This invention relates to improved means or apparatus for introducing fresh warmed air into buildings and the like, and treating such air so as to render it moist for certain purposes—such as for use in mills—and treating air so as to adapt it for medicinal or for curative purposes for use in hospitals, sick rooms, and the like. I provide a lamp, suitably placed. One or more tubes or passages (by preference curved) passes or pass through the lamp-case, one end of such tubes or passages being open to the air, permitting the air to enter or be drawn or forced through the hereinbefore-described tubes or passages, and as such tubes or passages are heated externally by the said lamp, the air as it passes through them is warmed, and then, before entering the building or room, it passes through a filtering-box of suitable construction, where the air is freed from dust, and, if required, from injurious gases or vapors also. The filtering-box may be dispensed with. The lamp is provided with a casing and with a funnel for the discharge of the products of combustion, and may be heated by gas or oil. The said funnel may also serve to discharge the vitiated air from the interior of the room by means of suitable openings. To establish the required current, the inlet from the atmosphere is at a lower level than the outlet by which the air enters the filtering-box. This filtering box or chamber is provided on the bottom with a tray for holding water or other liquid, coke or other porous material being placed in the chamber in and above the water. The air thus becomes moistened and filtered before entering the chamber. In the case of spinning-mills the filtering-chamber should be so arranged that the water shall be heated as required. Further, in the case of hospitals for consumptives or those suffering from bronchial affections, I provide the filtering-chamber with a tray for containing pine-oil or eucalyptus-oil, which has properties like those of pine-oil, over which the air is made to pass before entering the chamber, and, if required, the air before entering the chamber may also be caused to pass through or over coke saturated or treated with the above-mentioned oil or oils. Pine-oil, or coke, or other suitable porous material saturated with pine-oil, may be used without the aid of heat for curative purposes and by means of other forms of apparatus.

In order to enable my invention to be better understood and readily carried into effect, I will now proceed to describe the same by reference to the accompanying drawings, in which—

Figure 1 is a vertical section, showing my improvements applied to a building; and Fig. 2 is a vertical section of a modification of the arrangement shown in Fig. 1; Fig. 3, a trumpet mouth or cap.

Similar letters in all the figures represent similar or corresponding parts.

In the arrangement shown in Fig. 1 the exterior air enters by inlet $g$ and passes into the chamber $d$, and through the tubes $c$, chamber $e$, and tubes $c'$, and will be heated in its passage by means of the heat from the burners $b$ $b$ $b$, circulating round the tube $c$ $c'$, as shown by the arrows. The heated air from the tubes $c'$ passes into the filtering box or chamber $i$, and is deflected by the plate $q$, covered with fabric $r$, onto the water $m$ or other liquid contained in a tray in the bottom of the chamber $i$. Coke or other porous material is placed in the chamber above the water and on a perforated tray, as shown at $i'$. $n$ is a trough in the chamber $i$, the said trough containing any suitable disinfecting-liquid, in which dips the fabric $o$. The air thus becomes moistened, filtered, and disinfected before it passes through the openings $l$ into the room. In the case of spinning-mills arrangements should be provided for heating the water $m$ to increase the amount of moisture.

The modified arrangement shown in Fig. 2 will be understood without further description, similar letters to those used in Fig. 1 being used to represent similar or corresponding parts in Fig. 2. This modification is, however, more specially adapted where a fire or furnace is employed for heating the air instead of gas or oil, although gas or oil may be employed. Further, in the case of hospitals for consumptives or those suffering from bronchial affections, I place in filtering-chambers, such as are hereinbefore referred to, or in air-inlet pipes or chambers, through which ventilating currents of air are made to pass, trays or vessels containing pine-oil or eucalyptus-oil, over which the air is made to pass before entering the chamber; and, if required, the air before entering the chamber may also be caused to pass through or over coke saturated or treated with pine-oil or essential oil, as aforesaid, for the purposes stated.

Pine-oil, or coke or other suitable porous material saturated with pine-oil or eucalyptus-oil, as aforesaid, may be used without the aid of heat for curative purposes and by means of other forms of apparatus than those described.

By the employment of pine-oil or eucalyptus-oil in the manner described I am enabled to provide air, the conditions of which correspond with the air of those climates which have been proved to be beneficial to persons afflicted with the various forms of pulmonary and bronchial affections, with the further advantage of being able to maintain comparative uniformity of the curative conditions required.

It will be evident that by my improvements other forms of diseases than those above named may be treated by employing suitable antiseptic, disinfecting, aromatic, or balsamic agents. In all cases peroxide of hydrogen can be used with advantage with my improvements for treating incoming air.

Having now described the nature of my said invention and the manner of performing the same, I wish it to be understood that I do not claim, broadly, the mere heating of air by causing it to pass through a series of tubes to which heat is applied for warming and ventilating purposes; but

What I do claim is—

In combination with case $a$ and with its heating-burners, inlet-pipe $g$, and heating tube or tubes passing through such case, the water or filtering box $i$, deflector $q\ r$, tray $i'$, trough $n$, fabric $o$, and outlet-passages $k$ and $l$, substantially as and for the purposes set forth.

THOMAS ROWAN.

Witnesses:
  A. ALBUTT,
  B. BRADY.